United States Patent
Liu et al.

(10) Patent No.: US 12,051,929 B2
(45) Date of Patent: Jul. 30, 2024

(54) METHOD AND DEVICE FOR WARNING OVERDISCHARGE OF BATTERY, BATTERY AND AERIAL VEHICLE

(71) Applicant: AUTEL ROBOTICS CO., LTD., Guangdong (CN)

(72) Inventors: Yuhua Liu, Guangdong (CN); Wei Qin, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 386 days.

(21) Appl. No.: 17/352,753

(22) Filed: Jun. 21, 2021

(65) Prior Publication Data

US 2021/0313817 A1   Oct. 7, 2021

Related U.S. Application Data

(63) Continuation of application No. PCT/CN2019/126712, filed on Dec. 19, 2019.

(30) Foreign Application Priority Data

Dec. 21, 2018 (CN) .......................... 201811574640.8

(51) Int. Cl.
   *H02J 7/00*   (2006.01)
(52) U.S. Cl.
   CPC ........ *H02J 7/0048* (2020.01); *H02J 7/00306* (2020.01)
(58) Field of Classification Search
   CPC ............................ H02J 7/0048; H02J 7/00306
   See application file for complete search history.

(56) References Cited

U.S. PATENT DOCUMENTS

| 6,020,718 A * | 2/2000 | Ozawa | ..................... H02H 7/18 |
| | | | 320/112 |
| 2006/0214627 A1* | 9/2006 | Ito | ....................... H01M 10/443 |
| | | | 320/107 |

(Continued)

FOREIGN PATENT DOCUMENTS

| CN | 106602626 A | 4/2017 | |
| CN | 107689655 | * 9/2017 | ............ H02J 7/0031 |

(Continued)

OTHER PUBLICATIONS

The International Search Report mailed Mar. 19, 2020; Appln. No. PCT/CN2019/126712.

(Continued)

*Primary Examiner* — Hongmin Fan
(74) *Attorney, Agent, or Firm* — Frank Gao, Esq.

(57) ABSTRACT

Embodiments of the present invention disclose a method and device for warning overdischarge of a battery, a battery and an aerial vehicle. The battery is configured to supply power to a moving platform. The method includes: acquiring a number of times of overdischarge damage of the battery, where the number of times of overdischarge damage is obtained based on minimum voltage values of the battery in previous discharge processes and a preset overdischarge judgment criterion, and the preset overdischarge judgment criterion is less than a voltage threshold of overdischarge of the battery; and giving a battery overdischarge warning according to the number of times of overdischarge damage of the battery.

30 Claims, 7 Drawing Sheets

(56) References Cited

U.S. PATENT DOCUMENTS

| | | | |
|---|---|---|---|
| 2007/0126407 A1* | 6/2007 | Loong | G05F 5/00 |
| | | | 323/210 |
| 2009/0039833 A1* | 2/2009 | Kitagawa | H01M 10/48 |
| | | | 320/134 |
| 2016/0344206 A1 | 11/2016 | Ono | |

FOREIGN PATENT DOCUMENTS

| | | | | |
|---|---|---|---|---|
| CN | 107689655 A | | 2/2018 | |
| CN | 108767929 A | | 11/2018 | |
| CN | 108919132 A | | 11/2018 | |
| CN | 109617167 A | | 4/2019 | |
| JP | 2003134683 | * | 10/2001 | Y02E 60/10 |
| JP | 2012151994 | * | 1/2011 | Y02E 60/10 |

OTHER PUBLICATIONS

The First Chinese Office Action dated Apr. 15, 2020; Appln. No. 201811574640.8.

* cited by examiner

METHOD AND DEVICE FOR WARNING OVERDISCHARGE OF BATTERY, BATTERY AND AERIAL VEHICLE

CROSS REFERENCE

The present application is a continuation of the International Application No. PCT/CN2019/126712, filed on Dec. 19, 2019, which claims priority of Chinese patent No. 2018115746408, filed on Dec. 21, 2018, both of which are hereby incorporated by reference in their entireties.

BACKGROUND

Technical Field

Embodiments of the present invention relate to the field of battery technologies, and in particular, to a method and device for warning overdischarge of a battery, a battery, and an aerial vehicle.

Related Art

As a battery discharges during use, the voltage of the cell therein will gradually drop. When the voltage of the cell drops to a certain voltage value, the battery should stop discharging and then be charged to restore its power storage capacity. If the voltage of the cell has dropped to a certain value during the discharge process but the discharge is still not stopped, excessive discharging, i.e., overdischarge occurs. The occurrence of overdischarge, especially the occurrence of deep overdischarge, will bring some irreversible damage to the battery itself, leading to a shortened service life of the battery and affecting the normal use of the battery.

Generally, some protective measures against overdischarge are adopted in batteries for drones. However, to ensure the safety of drones during flight as much as possible, such protection strategies against battery overdischarge are employed prudently. Therefore, if the drone fails to turn back in time due to some man-made operations during the flight if or other abnormal operations are performed, the battery is very likely to overdischarge during the flight. After many times of overdischarge, the performance of the battery will change greatly, which is very likely to cause a sudden change in the electric quantity and lead to a crash.

In the process of implementing the present invention, the inventor has found that for such battery overdischarge caused by abnormal or extreme operations, when the protection strategy is no longer sufficient to ensure the battery safety, the user needs to be warned about the overdischarge, so as to take measures to avoid unsafe accidents as much as possible.

SUMMARY

The main technical problem solved by the embodiments of the present invention is to provide an overdischarge warning method, device, battery and aerial vehicle, which can give a warning according to the degree and number of occurrences of overdischarge of the battery, so that a moving platform and/or a user can perform a corresponding response and operation according to the warning to ensure the safety of the moving platform during operation.

To solve the above technical problem, a technical solution adopted in the embodiments of the present invention is as follows: A first aspect provides a method and device for warning overdischarge of a battery, where the battery is configured to supply power to a moving platform, the method including:

acquiring a number of times of overdischarge damage of the battery, where the number of times of overdischarge damage is obtained based on minimum voltage values of the battery in previous discharge processes and a preset overdischarge judgment criterion, and the preset overdischarge judgment criterion is less than a voltage threshold of overdischarge of the battery; and giving a battery overdischarge warning according to the number of times of overdischarge damage of the battery.

In an embodiment, the acquiring a number of times of overdischarge damage of the battery includes:

acquiring a minimum voltage value record of the battery, where the minimum voltage value record is a set of minimum voltage values of the battery in the previous discharge processes; and acquiring the number of times of overdischarge damage of the battery according to the minimum voltage value record.

Optionally, the acquiring a minimum voltage value record of the battery includes:

recording minimum voltage values of the battery in the previous discharge processes; and storing the minimum voltage values of the battery in the previous discharge processes to form the minimum voltage value record.

Optionally, the acquiring a minimum voltage value record of the battery includes:

determining, in each discharge process of the battery, whether a voltage of the battery is lower than the voltage threshold of overdischarge of the battery; and if yes, recording a minimum voltage value of the battery in each discharge process, where the minimum voltage value is used for forming the minimum voltage value record.

Optionally, the acquiring the number of times of overdischarge damage of the battery according to the minimum voltage value record includes:

comparing each minimum voltage value in the minimum voltage value record with the preset overdischarge judgment criterion; and calculating a number of times the minimum voltage values in the minimum voltage value record are less than the preset overdischarge judgment criterion, to obtain the number of times of overdischarge damage of the battery.

In an embodiment, the acquiring a number of times of overdischarge damage of the battery includes:

acquiring a minimum voltage value of the battery in each discharge process, and determining whether the minimum voltage value is lower than the preset overdischarge judgment criterion; and if yes, increasing the number of times of overdischarge damage of the battery by 1, and recording the updated number of times of overdischarge damage; and acquiring a latest number of times of overdischarge damage of the battery.

Optionally, the acquiring a minimum voltage value of the battery in each discharge process includes:

determining, in each discharge process of the battery, whether a voltage of the battery is lower than the voltage threshold of overdischarge of the battery; and if yes, acquiring the minimum voltage value of the battery in each discharge processes.

In an embodiment, the voltage threshold of overdischarge of the battery is 3 V, and the preset overdischarge judgment criterion is 1.5 V.

Optionally, the giving a battery overdischarge warning according to the number of times of overdischarge damage of the battery includes:

when the number of times of overdischarge damage of the battery is greater than 0 and is less than a first preset number, giving a first-level warning prompt, where the first-level warning prompt is used for prompting that the battery has a safety hazard.

Optionally, the giving a battery overdischarge warning according to the number of times of overdischarge damage of the battery includes:

when the number of times of overdischarge damage of the battery is greater than or equal to a first preset number and is less than a second preset number, giving a second-level warning prompt, where the second-level warning prompt is used for limiting a movement region of the moving platform.

Optionally, the giving a battery overdischarge warning according to the number of times of overdischarge damage of the battery includes:

when the number of times of overdischarge damage of the battery is greater than or equal to a second preset number, giving a third-level warning prompt, where the third-level warning prompt is used for prohibiting the moving platform from starting.

In an embodiment, the battery further includes a display device, and the method further includes:

displaying the overdischarge warning and/or the number of times of overdischarge damage on the display device of the battery.

Optionally, before the acquiring a number of times of overdischarge damage of the battery, the method further includes:

determining that the battery has been turned on.

In an embodiment, the method further includes:

sending the overdischarge warning and/or the number of times of overdischarge damage to a control device, to display the overdischarge warning and/or the number of times of overdischarge damage on the control device, where the control device is configured to control the moving platform and is communicably connected to the moving platform. In an embodiment, before the acquiring a number of times of overdischarge damage of the battery, the method further includes:

acquiring identification information of the battery, where the identification information is used for identifying an identity of the battery; and the acquiring a number of times of overdischarge damage of the battery includes:

acquiring the number of times of overdischarge damage of the battery according to the identification information of the battery.

Optionally, the moving platform is an aerial vehicle.

A second aspect provides a device for warning overdischarge of a battery, where the battery is configured to supply power to a moving platform, the device including:

a damage number acquiring module, configured to acquire a number of times of overdischarge damage of the battery, where the number of times of overdischarge damage is obtained based on minimum voltage values of the battery in previous discharge processes and a preset overdischarge judgment criterion, and the preset overdischarge judgment criterion is less than a voltage threshold of overdischarge of the battery; and an overdischarge warning module, configured to give a battery overdischarge warning according to the number of times of overdischarge damage of the battery.

In an embodiment, the damage number acquiring module includes:

a minimum value recording submodule, configured to acquire a minimum voltage value record of the battery, where the minimum voltage value record is a set of minimum voltage values of the battery in the previous discharge processes; and a damage number calculation submodule, configured to acquire the number of times of overdischarge damage of the battery according to the minimum voltage value record.

Optionally, the acquiring a minimum voltage value record of the battery includes:

record minimum voltage values of the battery in the previous discharge processes; and store the minimum voltage values of the battery in the previous discharge processes to form the minimum voltage value record.

Optionally, the acquiring a minimum voltage value record of the battery includes:

determine, in each discharge process of the battery, whether a voltage of the battery is lower than the voltage threshold of overdischarge of the battery; and if yes, record a minimum voltage value of the battery in each discharge process, where the minimum voltage value is used for forming the minimum voltage value record.

Optionally, the damage number calculation submodule is further configured to:

compare each minimum voltage value in the minimum voltage value record with the preset overdischarge judgment criterion; and calculate a number of times the minimum voltage values in the minimum voltage value record are less than the preset overdischarge judgment criterion, to obtain the number of times of overdischarge damage of the battery.

In an embodiment, the damage number acquiring module includes:

a damage judgment submodule, configured to acquire a minimum voltage value of the battery in each discharge process, and determine whether the minimum voltage value is lower than the preset overdischarge judgment criterion; and a damage number updating submodule, configured to: increase the number of times of overdischarge damage of the battery by 1, and record the updated number of times of overdischarge damage; and the damage number acquiring module is further configured to:

acquire a latest number of times of overdischarge damage of the battery.

Optionally, the acquiring a minimum voltage value of the battery in each discharge process includes:

determine, in each discharge process of the battery, whether a voltage of the battery is lower than the voltage threshold of overdischarge of the battery; and if yes, acquire the minimum voltage value of the battery in each discharge processes.

Optionally, the voltage threshold of overdischarge of the battery is 3 V, and the preset overdischarge judgment criterion is 1.5 V.

Optionally, the overdischarge warning module includes:
a first-level warning submodule, configured to: when the number of times of overdischarge damage of the battery is greater than 0 and is less than a first preset number, give a first-level warning prompt, where the first-level warning prompt is used for prompting that the battery has a safety hazard.

Optionally, the overdischarge warning module includes:
a first-level warning submodule, configured to: when the number of times of overdischarge damage of the battery is greater than or equal to a first preset number and is less than a second preset number, give a second-level warning prompt, where the second-level warning prompt is used for limiting a movement region of the moving platform.

Optionally, the overdischarge warning module includes:
a third-level warning submodule, configured to: when the number of times of overdischarge damage of the battery is greater than or equal to a second preset number, give a third-level warning prompt, where the third-level warning prompt is used for prohibiting the moving platform from starting.

In an embodiment, the battery further includes a display device, and the device further includes:
a display module, configured to display the overdischarge warning and/or the number of times of overdischarge damage on the display device of the battery.

Optionally, the device further includes:
a power-on determining module, configured to determine that the battery has been turned on.

In an embodiment, the device further includes:
a sending module, configured to send the overdischarge warning and/or the number of times of overdischarge damage to a control device, to display the overdischarge warning and/or the number of times of overdischarge damage on the control device, where the control device is configured to control the moving platform and is communicably connected to the moving platform.

In an embodiment, the device further includes:
an identification information acquiring module, configured to acquire identification information of the battery, where the identification information is used for identifying an identity of the battery; and
the damage number acquiring module is further configured to:
acquire the number of times of overdischarge damage of the battery according to the identification information of the battery.

Optionally, the moving platform is an aerial vehicle.

A third aspect provides a battery, including a housing and a cell disposed inside the housing, the battery further including a control chip, where the control chip is electrically connected to the cell, and the control chip includes:
at least one processor; and
a memory communicatively connected to the at least one processor, where
the memory storing instructions executable by the at least one processor, the instructions being executed by the at least one processor, to enable the at least one processor to perform the method described above.

A fourth aspect provides an aerial vehicle, including a vehicle body, an arm connected to the vehicle body, a power device disposed on the arm, and a battery disposed on the vehicle body, where the battery is the battery described above and is configured to supply power to the aerial vehicle.

According to the fifth aspect, the embodiments of the present invention further provide a computer program product, including a computer program stored in a non-volatile computer-readable storage medium, the computer program including program instructions, the program instructions, when executed by a computer, causing the computer to perform the method described above.

According to a sixth aspect, the embodiments of the present invention further provide a non-volatile computer-readable storage medium, the computer-readable storage medium storing computer executable instructions, the computer executable instructions being configured to cause a computer to perform the method described above.

Beneficial effects of the embodiments of the present invention are as follows: In the embodiments of the present invention, a number of times of overdischarge damage of the battery is acquired, and a battery overdischarge warning is given according to the number of times of overdischarge damage of the battery. Because the number of times of overdischarge damage is obtained based on minimum voltage values of the battery in previous discharge processes and a preset overdischarge judgment criterion, and the preset overdischarge judgment criterion is less than a voltage threshold of overdischarge of the battery, a warning can be given according to the degree and number of occurrences of overdischarge of the battery, so that a moving platform and/or a user can perform a corresponding response and operation according to the warning to ensure the safety of the moving platform during operation.

BRIEF DESCRIPTION OF THE DRAWINGS

One or more embodiments are exemplarily described with reference to the corresponding figures in the accompanying drawings, and the descriptions are not to be construed as limiting the embodiments. Elements in the accompanying drawings that have same reference numerals are represented as similar elements, and unless otherwise particularly stated, the figures in the accompanying drawings are not drawn to scale.

DETAILED DESCRIPTION

The following clearly describes the technical solutions in the embodiments of the present invention in detail with reference to the accompanying drawings. Apparently, the described embodiments are merely a part rather than all of the embodiments of the present invention. All other embodiments obtained by a person of ordinary skill in the art based on the embodiments of the present invention without creative effects shall fall within the protection scope of the present invention.

A term "and/or" used in this specification includes any or all combinations of one or more related listed items. It should be noted that, when a component is expressed as "being fixed to" another component, the component may be directly on the another component, or one or more intermediate components may exist between the component and the another component. When one component is expressed as "being connected to" another component, the component may be directly connected to the another component, or one or more intermediate components may exist between the component and the another component.

In addition, technical features involved in different implementations of the present invention described below may be combined together if there is no conflict.

Figure 1:
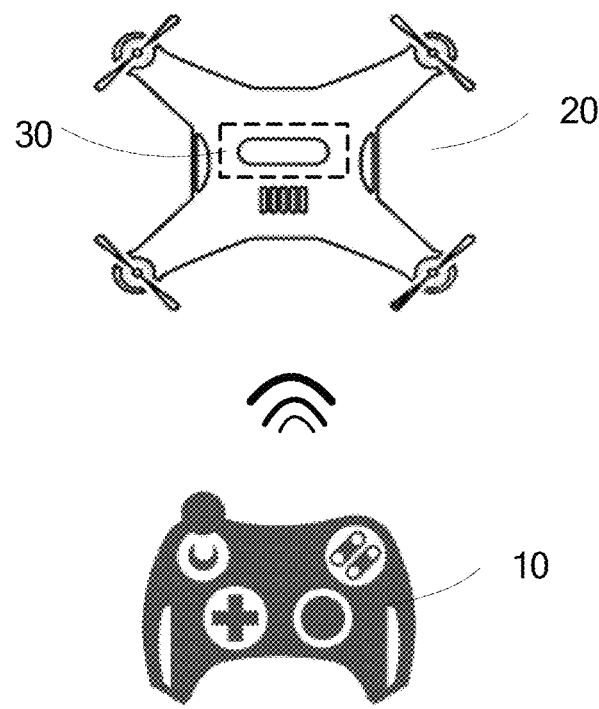
FIG. 1 is a schematic diagram of an implementation environment involved in the embodiments of the present invention.

FIG. 1 is a schematic diagram of an implementation environment involved in various embodiments of the present invention. As shown in FIG. 1, the implementation environment includes a control device 10, a moving platform 20, and a battery 30 configured to supply power to the moving platform 20.

The control device 10 includes a first communication interface configured therein, and the first communication interface is configured to communicate with the moving platform 20. The moving platform 20 includes a second communication interface configured therein, and the second communication interface is configured to communicate with the control device 10.

The control device 10 may include a remote control, a smart phone, a tablet computer, or an image display device, and the like. The moving platform 20 may include an aerial vehicle, an electric vehicle, and the like. The control device 10 and the moving platform 20 may be communicably connected to each other using a wired technology or wireless technology. The mode of connection between the control device 10 and the moving platform is not limited herein.

For example, in a specific application scenario, the control device 10 may be a remote control, the moving platform 20 may be an aerial vehicle, and the remote control and the aerial vehicle are communicably connected to each other using a wireless technology. The aerial vehicle includes a vehicle body, an arm connected to the vehicle body, a power device disposed on the arm, and a battery 30 disposed on the vehicle body. The battery 30 is configured to supply power to the aerial vehicle. The battery 30 may be a lithium battery, a nickel-cadmium battery or other storage batteries.

Figure 2:
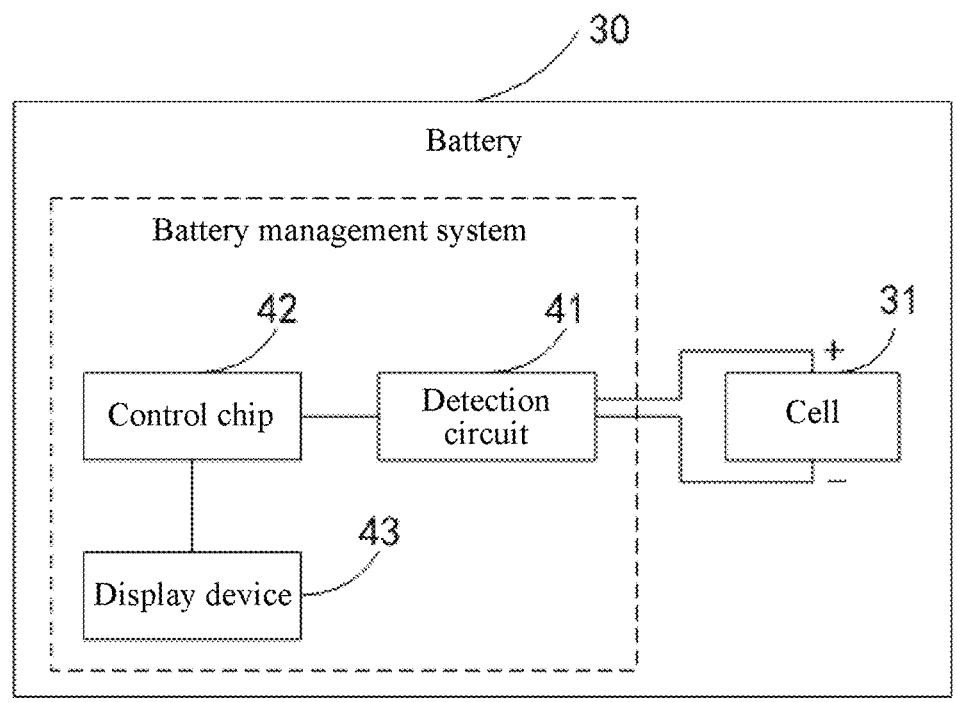
FIG. 2 is a schematic diagram of a hardware structure of a battery involved in an embodiment of the present invention.

As shown in FIG. 2, in an embodiment, the battery 30 includes a housing (not shown in the figure), and a cell 31 and a battery management system 40 disposed inside the housing, and the battery management system 40 is electrically connected to the cell 31 and is configured to manage and monitor the cell.

Specifically, the battery 30 may include a plurality of cells 31 connected in series and/or in parallel, the battery management system 40 includes a detection circuit 41 and a control chip 42, and the control chip 42 is electrically connected to the cells 31 through the detection circuit 41. The detection circuit 41 is configured to detect electrical parameters of the cells. The control chip 42 is configured to acquire the electrical parameters, determine a status and safety performance of the battery according to the parameters, and store data information of the battery 30.

Furthermore, the control chip 42 can monitor the discharge of the battery 30, record a minimum voltage value that appears in each discharge process, and determine a number of times of overdischarge damage of the battery 30 based on the minimum voltage values of the battery 30 in previous discharge processes and a preset overdischarge judgment criterion, and therefore can give a warning according to the degree and number of occurrences of overdischarge of the battery 30, so that a moving platform and/or a user can perform a corresponding response and operation according to the warning to ensure the safety of the moving platform during operation.

Figure 3:
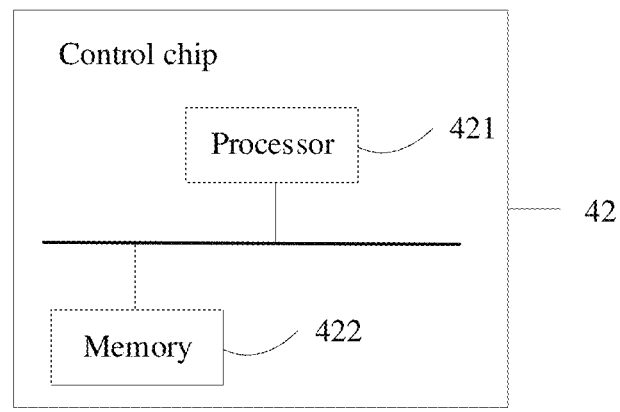
FIG. 3 is a schematic diagram of a hardware structure of a control chip involved in an embodiment of the present invention.

As shown in FIG. 3, the control chip 42 includes:
one or more processors 421 and a memory 422. One processor 421 is used as an example in FIG. 2.

The processor 421 and the memory 422 may be connected by using a bus or in another manner. A connection by using the bus is used as an example in FIG. 2.

The memory 422, as a non-volatile computer-readable storage medium, may be configured to store a non-volatile software program, a non-volatile computer-executable program, and modules, for example, program instructions/modules corresponding to the method for warning overdischarge of a battery in the embodiments of the present invention. By running the non-volatile software programs, instructions, and modules stored in the memory 422, the processor 421 executes various functional applications and data processing of the control chip 42, i.e., implements the method for warning overdischarge of a battery in the method embodiments of the present invention.

The memory 422 may include a program storage area and a data storage area. The program storage area may store an operating system, an application program required by at least one function and the like. The data storage area may store data created according to use of the control chip 42 or the like. In addition, the memory 422 may include a high speed random access memory, and may also include a non-volatile memory, such as at least one magnetic disk storage device, a flash memory, or another volatile solid-state storage device. In some embodiments, the memory 422 optionally includes memories remotely disposed relative to the processor 421, and these remote memories may be connected to the control chip 42 by using a network. Examples of the network include, but not limited to, the Internet, an intranet, a local area network, a mobile communication network and a combination thereof.

The one or more modules are stored in the memory 422, and when executed by the one or more processors 421, execute a method for warning overdischarge of a battery in any of the method embodiments described below, and realize the functions of modules in the following device embodiments described below.

As a preferred solution, the battery management system 40 may further include a display device 43 (for example, an LED light and/or an LED screen), configured to display the overdischarge warning and/or the number of times of overdischarge damage of the battery 30.

Figure 4:
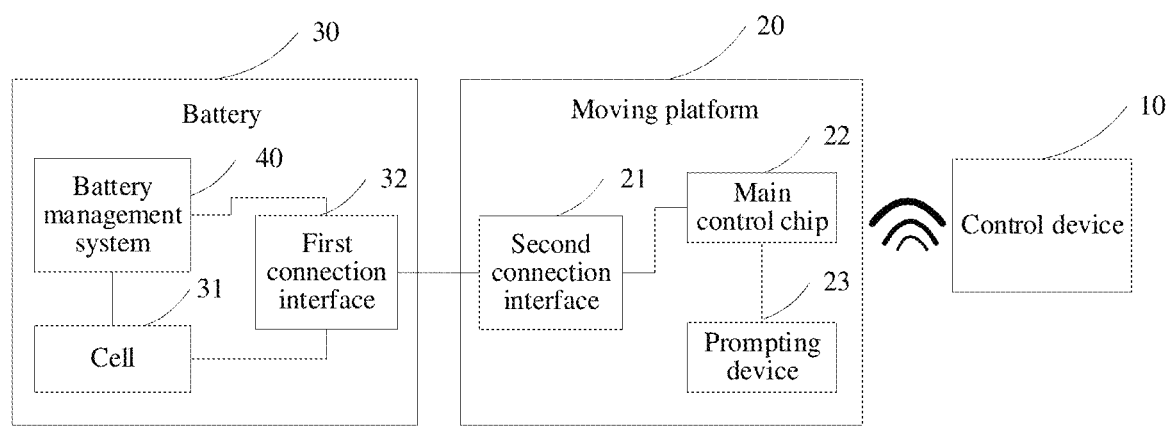
FIG. 4 is a schematic diagram of a hardware structure of an implementation environment involved in an embodiment of the present invention.

As shown in FIG. 4, the battery 30 is provided with a first connection interface 32, the first connection interface 32 is electrically connected to the cells 31 and the battery management system 40, the moving platform 20 is provided with a second connection interface 21, the second connection interface 21 is electrically connected to a main control chip 22, and the battery 30 supplies power to the moving platform 20 through a connection between the first connection interface 32 and the second connection interface 21, and communicates with the moving platform 20.

The main control chip 22 may receive from the control chip 42 the overdischarge warning and/or the number of times of overdischarge damage of the battery 30, or the main control chip 22 may acquire the data information stored in the memory 422 in the control chip 42, determine the number of times of overdischarge damage of the battery 30 according to the data information, and give an overdischarge warning according to the number of times of overdischarge damage. After receiving the overdischarge warning, the main control chip 22 further controls the moving platform 20 according to the overdischarge warning.

The main control chip 22 is further configured to send the overdischarge warning and/or the number of times of overdischarge damage of the battery 30 to the control device 10, to display the overdischarge warning and/or the number of times of overdischarge damage of the battery on the control device 10, to alert the user.

As a preferred solution, the moving platform 20 further includes a prompting device 23. When the safety performance of the battery 30 is reduced, the main control chip 22 may control the prompting device 224 to give an overdischarge warning and/or indicate the number of times of overdischarge damage of the battery 30, to alert the user. In this implementation environment, the control device 10 may also not be included.

In other embodiments, the battery may not include the battery management system 40 or the control chip 42, that is, the battery management system 40 or the control chip 42 is independent of the battery 30, and the function of the control chip 42 is realized by the main control chip 22.

In a case that the moving platform 20 can use a spare battery, the moving platform 20 is further provided with a battery information acquisition device configured to acquire identification information of the battery 30, where the identification information is used for identifying an identity of the battery 30. In this way, the main control chip 22 can determine the number of times of overdischarge damage of the battery 30 according to the identity of the battery 30.

Based on the above description, the embodiments of the present invention will be further described in detail below with reference to the accompanying drawings.

Embodiment 1

Figure 5:
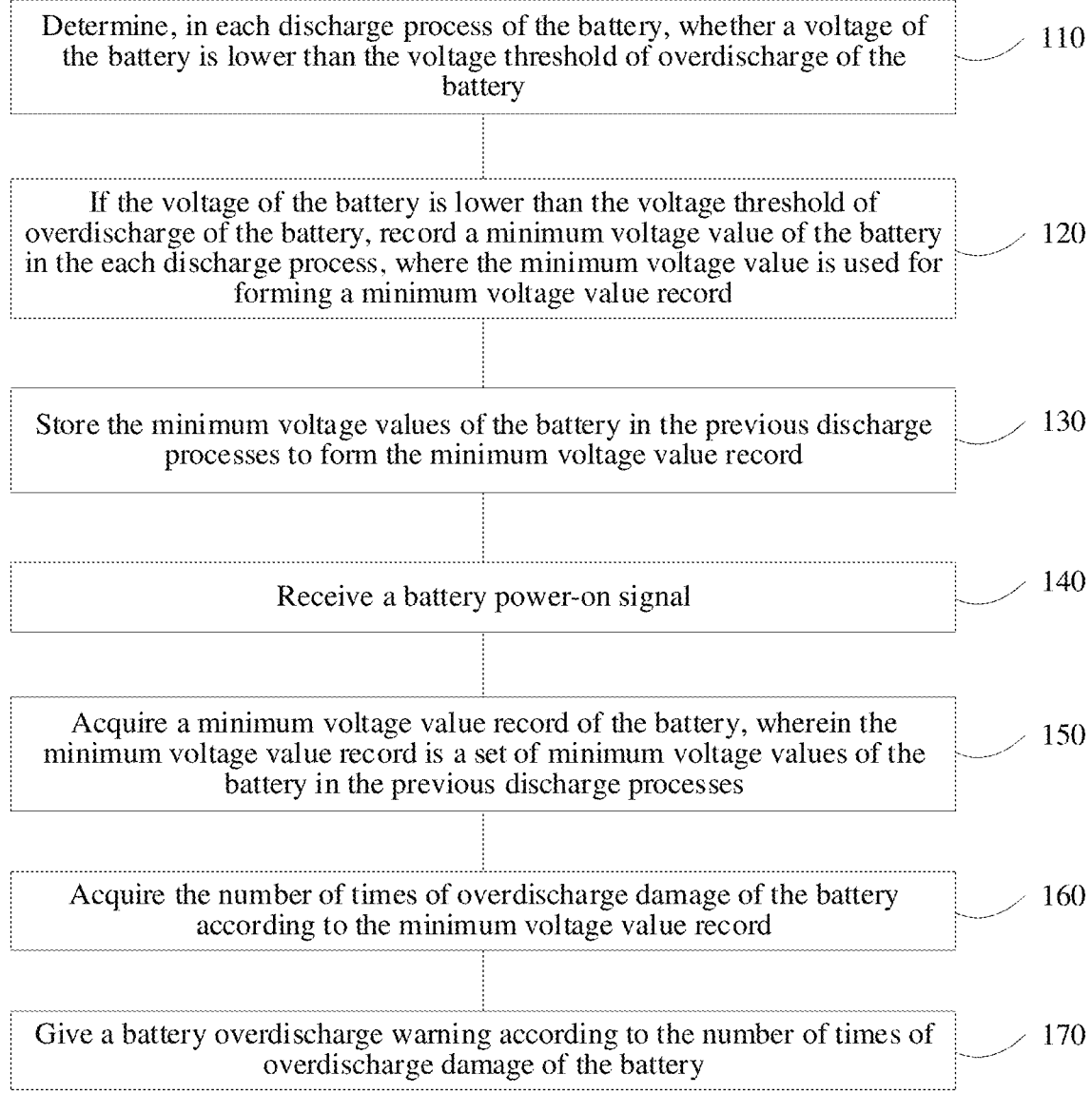
FIG. 5 is a schematic diagram of a method for warning overdischarge of a battery according to a first embodiment of the present invention.

Referring to FIG. 5, FIG. 5 is a schematic diagram of a method for warning overdischarge of a battery according to an embodiment of the present invention. The battery is configured to supply power to a moving platform. The method is applied to the battery or the moving platform. The method includes:

Step 110: Determine, in each discharge process of the battery, whether a voltage of the battery is lower than the voltage threshold of overdischarge of the battery.

It can be understood that the voltage of the battery or the battery voltage is a minimum voltage value among voltages of cells in the battery. Generally, the battery includes at least one cell, that is, the number of cells in the battery may be one or more cells in the at least one cell may be connected in series, in parallel, or in series and parallel to form an energy storage unit having sufficient energy and power to perform an expected function of the battery. For example, taking a battery of an aerial vehicle as an example, cells in at least one cell are connected in series, in parallel, or in series and parallel to provide power to various system in the aerial vehicle system.

A change in the performance of any cell in the battery affects the performance of the entire battery. Therefore, to accurately monitor the status of the battery during the discharge process, in the embodiments of the present invention, the control chip of the battery or the main control chip of the moving platform monitors the voltage of each cell in real time, and determine a minimum voltage value among the voltages of the cells as the voltage of the battery.

For example, the cells of the battery include: "cell 1", "cell 2", "cell 3" and "cell 4", and if it is acquired at a moment in the battery discharge process (which may be any moment in the battery discharge process) that the voltage of "cell 1" is 4.48 V, the voltage of "cell 2" is 3.64 V, the voltage of "cell 3" is 4.24 V, and the voltage of "cell 4" is 4.22 V, the voltage of the battery at this moment is 3.64 V.

Further, the control chip of the battery or the main control chip of the moving platform compares the voltage of the battery in the battery discharge process with the voltage threshold of overdischarge of the battery to determine whether overdischarge occurs in the battery discharge process.

In an embodiment, the voltage threshold of overdischarge of the battery is a discharge cut-off voltage of the cell. The discharge cut-off voltage refers to the lowest working voltage that the voltage can drop to during the discharge process and at which the discharge should be stopped. According to different battery types and different discharge conditions, the requirements for the capacity and life of the battery vary, and the discharge cut-off voltage of the cell also varies. The voltage threshold of overdischarge of the battery may be configured in advance, or may be set as required.

Taking a lithium battery as an example, in order to take into account the service life, capacity and safety of the battery, there is a lower voltage limit for the cells of the lithium battery during discharge. When the cell voltage is lower than 2.4 V, some materials will begin to be destroyed. Because the cell can self-discharge and a longer discharge leads to a lower voltage, it is preferred to stop the discharge before the voltage drops to 2.4 V. Because energy released by the cells in the lithium battery during the discharge period where the voltage drops from 3.0 V to 2.4 V only accounts for about 3% of the battery capacity, generally 3.0 V is an ideal discharge cut-off voltage. That is to say, in some implementations, the voltage threshold of overdischarge of the battery may be 3.0 V.

In some other implementations, to be conservative, the voltage threshold of overdischarge of the battery may be slightly greater than 3.0 V, for example, the voltage threshold of overdischarge of the battery is 3.2 V.

Step 120: If the voltage of the battery is lower than the voltage threshold of overdischarge of the battery, record a minimum voltage value of the battery in each discharge process, where the minimum voltage value is used for forming a minimum voltage value record.

When the control chip of the battery or the main control chip of the moving platform determines that the voltage of the battery is lower than the voltage threshold of overdischarge of the battery, it can be determined that the battery has overdischarged, and the battery voltage at each moment during the overdischarge process is cached. Specifically, the control chip of the battery or the main control chip of the moving platform monitors the voltage of each cell at a preset monitoring frequency, where the preset monitoring frequency may be set as required. For example, the preset monitoring frequency is 1 Hz, that is, the voltage of each cell is monitored every 1s, and the voltage of the battery second is acquired every is during the monitoring process.

It should be noted that the battery voltage acquired each time may be cached; or a currently acquired battery voltage may be compared with a battery voltage acquired last time, and only the voltage with the smaller voltage value is recorded.

For example, if it is acquired at a starting moment in the battery discharge process that the voltage of "cell 1" is 3.20 V, the voltage of "cell 2" is 3.05 V, the voltage of "cell 3" is 2.96 V, and the voltage of "cell 4" is 2.88 V, the voltage of the battery at the starting moment is the voltage of "cell 4", i.e., 2.88 V. If it is acquired at the first second in the battery discharge process that the voltage of "cell 1" is 3.02 V, the voltage of "cell 2" is 3.02 V, the voltage of "cell 3" is 2.82 V, and the voltage of "cell 4" is 2.88 V, the voltage of the battery at this moment is the voltage of "cell 3", i.e., 2.82 V, and the cached voltage data may include 2.88 V and 2.82 V or may include only 2.82 V.

After the battery discharge ends, a minimum voltage value of the battery in the overdischarge process is determined according to the cached voltage data, and this value is also a minimum voltage value of the battery during the entire discharge process.

As described above, the cell can self-discharge. In fact, the battery is in a discharging state during the entire service life of the battery. Those skilled in the art can understand that the end of the battery discharge as described in this embodiment means that a battery shutdown signal is received.

When the battery voltage acquired each time has been recorded, a minimum voltage value of the battery in this overdischarge process can be obtained by comparing the voltage values; when only the voltage with the smaller voltage value is cached, the latest cached voltage value is the minimum voltage value of the battery in this overdischarge process. The minimum voltage value of the battery in the overdischarge process is recorded, which is used for forming the minimum voltage value record.

It should be noted that the step of determining, in each discharge process of the battery, whether a voltage of the battery is lower than the voltage threshold of overdischarge of the battery may be not necessary. In another embodiment, in the battery discharge process, the battery voltage at each moment during the overdischarge process may be directly cached, and after the battery discharge ends, a minimum voltage value of the battery in the discharge process is determined according to the cached voltage data, and the minimum voltage value of the battery in the discharge process is recorded.

Step 130: Store the minimum voltage values of the battery in the previous discharge processes to form the minimum voltage value record.

The minimum voltage value of the battery in each discharge process is stored in the control chip of the battery or in the main control chip of the moving platform to form a minimum voltage value record to provide a basis for the evaluation of the safety performance of the battery.

The memory in the chip generally includes a volatile memory (random access memory, RAM) and a non-volatile memory (such as a flash memory). In actual applications, the voltage of each cell and the voltage of the battery during the monitoring process may be stored in the volatile memory, and the voltage threshold of overdischarge of the battery and the minimum voltage value in the discharge process may be stored in the non-volatile memory and will not be lost after power off.

Step 140: Receive a battery power-on signal.

Step 150: Acquire a minimum voltage value record of the battery, where the minimum voltage value record is a set of minimum voltage values of the battery in the previous discharge processes.

Step 160: Acquire the number of times of overdischarge damage of the battery according to the minimum voltage value record.

Specifically, the acquiring the number of times of overdischarge damage of the battery according to the minimum voltage value record includes: comparing each minimum voltage value in the minimum voltage value record with the preset overdischarge judgment criterion; and calculating a number of times the minimum voltage values in the minimum voltage value record are less than the preset overdischarge judgment criterion, to obtain the number of times of overdischarge damage of the battery.

The preset overdischarge judgment criterion is less than the voltage threshold of overdischarge of the battery. The preset overdischarge judgment criterion is defined as such a threshold that when the voltage value of the battery is lower than this threshold, the battery will be irreversibly damaged. According to different battery types and different discharge conditions, the requirements for the capacity and life of the battery vary, and the preset overdischarge judgment criterion of the battery also varies. The preset overdischarge judgment criterion may be configured in advance, or may be set as required.

In this embodiment, the preset overdischarge judgment criterion is 50% of the voltage threshold of overdischarge of the battery. For example, the voltage threshold of overdischarge of the battery is 3.0 V, and the preset overdischarge judgment criterion is 1.5 V. In other embodiments, to be conservative, the preset overdischarge judgment criterion may be slightly larger, for example, the preset overdischarge judgment criterion is 60% of the voltage threshold of overdischarge of the battery; or to improve the utilization rate of battery, the preset overdischarge judgment criterion may be slightly smaller, for example, the preset overdischarge judgment criterion is 40% of the voltage threshold of overdischarge of the battery.

The number of times of overdischarge damage of the battery may be obtained based on the minimum voltage values of the battery in the previous discharge processes and the preset overdischarge judgment criterion. Exemplarily, when the preset overdischarge judgment criterion is 1.5 V, and the minimum voltage values of the battery in previous overdischarge processes are 1.25 V, 1.38 V, 1.6 V, and 2.34 V, respectively, the calculated number of times of overdischarge damage of the battery is 2.

Step 170: Give a battery overdischarge warning according to the number of times of overdischarge damage of the battery.

Specifically, when the number of times of overdischarge damage of the battery is greater than or equal to a preset value, the battery or the moving platform gives a battery overdischarge warning, and the moving platform and/or the user can perform a corresponding response and operation according to the warning to ensure the safety of the moving platform during operation. In specific implementations, the overdischarge warning may include a first-level warning prompt, a second-level warning prompt, and a third-level warning prompt. A larger number of times of overdischarge damage indicates a higher level of the warning prompt, and indicates a larger probability that the battery has a potential safety hazard.

In this embodiment, by storing the minimum voltage values of the battery in the discharge processes to form the minimum voltage value record, acquiring the minimum voltage value record of the battery after receiving a battery power-on signal, acquiring a number of times of overdischarge damage of the battery according to the minimum voltage value record, and giving a battery overdischarge warning according to the number of times of overdischarge damage of the battery, a warning can be given according to the degree and number of occurrences of overdischarge of the battery, so that the moving platform and/or the user can perform a corresponding response and operation according to the warning to ensure the safety of the moving platform during operation.

Embodiment 2

Figure 6:
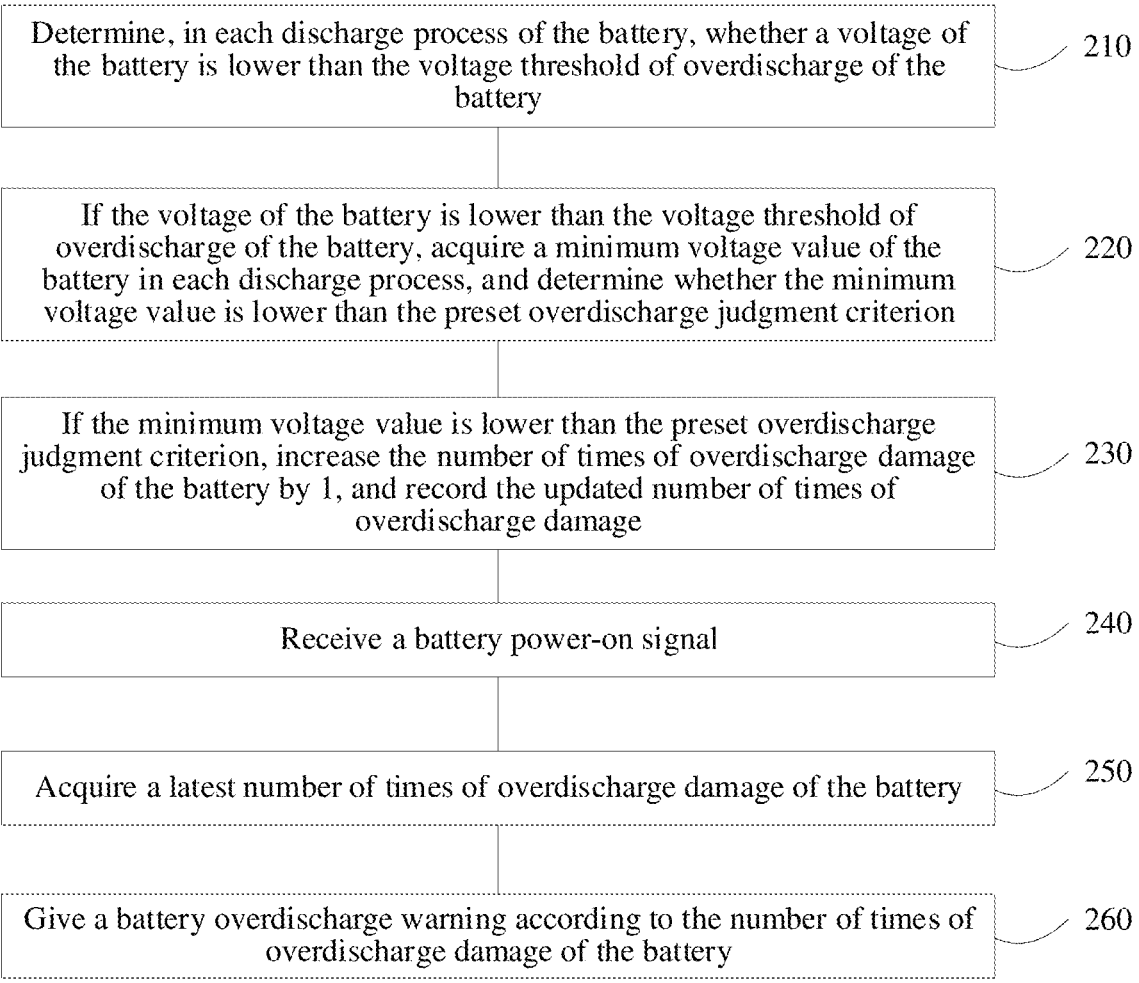
FIG. 6 is a schematic diagram of a method for warning overdischarge of a battery according to a second embodiment of the present invention.

Referring to FIG. 6, FIG. 6 is a schematic diagram of another method for warning overdischarge of a battery according to an embodiment of the present invention. The battery is configured to supply power to a moving platform. The method is applied to the battery or the moving platform. The method includes:

Step 210: Determine, in each discharge process of the battery, whether a voltage of the battery is lower than the voltage threshold of overdischarge of the battery.

Step 220: If the voltage of the battery is lower than the voltage threshold of overdischarge of the battery, acquire a minimum voltage value of the battery in each discharge process, and determine whether the minimum voltage value is lower than the preset overdischarge judgment criterion.

For the determining of whether the voltage of the battery is lower than the voltage threshold of overdischarge of the battery and the acquiring of the minimum voltage value of the battery in each discharge process, reference can be made to Embodiment 1.

Similarly, the step of determining, in each discharge process of the battery, whether a voltage of the battery is lower than the voltage threshold of overdischarge of the battery may be not necessary. In another embodiment, in the battery discharge process, the battery voltage at each moment during the overdischarge process may be directly cached, and after the battery discharge ends, the minimum voltage value of the battery in the discharge process is acquired according to the cached voltage data.

The preset overdischarge judgment criterion is less than the voltage threshold of overdischarge of the battery. The preset overdischarge judgment criterion is defined as such a threshold that when the voltage value of the battery is lower than this threshold, the battery will be irreversibly damaged. According to different battery types and different discharge conditions, the requirements for the capacity and life of the battery vary, and the preset overdischarge judgment criterion of the battery also varies. The preset overdischarge judgment criterion may be configured in advance, or may be set as required.

In this embodiment, the preset overdischarge judgment criterion is 50% of the voltage threshold of overdischarge of the battery. For example, the voltage threshold of overdischarge of the battery is 3.0 V, and the preset overdischarge judgment criterion is 1.5 V. In other embodiments, to be conservative, the preset overdischarge judgment criterion may be slightly larger, for example, the preset overdischarge judgment criterion is 60% of the voltage threshold of overdischarge of the battery; or to improve the utilization rate of battery, the preset overdischarge judgment criterion may be slightly smaller, for example, the preset overdischarge judgment criterion is 40% of the voltage threshold of overdischarge of the battery.

By comparing the minimum voltage value of the battery in the discharge process with the value of the preset overdischarge judgment criterion, it can be determined whether the current discharge will cause irreversible damage to the battery.

Step 230: If the minimum voltage value is lower than the preset overdischarge judgment criterion, increase the number of times of overdischarge damage of the battery by 1, and record the updated number of times of overdischarge damage.

The number of times of overdischarge damage of the battery is stored in the control chip of the battery or in the main control chip of the moving platform to provide a basis for the evaluation of the safety performance of the battery.

The memory in the chip generally includes a volatile memory (random access memory, RAM) and a non-volatile memory (such as a flash memory). In actual applications, the voltage of each cell, the voltage of the battery, and the minimum voltage value during the monitoring process may be stored in the volatile memory, and the voltage threshold of overdischarge of the battery, the preset overdischarge judgment criterion and the number of times of overdischarge damage of the battery may be stored in the non-volatile memory and will not be lost after power off.

If the minimum voltage value of the battery in the discharge process is less than the preset overdischarge judgment criterion, the number of times of overdischarge damage of the battery is increased by 1 based on the original value, and the updated number of times of overdischarge damage is stored in the non-volatile memory to replace the original value.

Step 240: Receive a battery power-on signal.

Step 250: Acquire a latest number of times of overdischarge damage of the battery.

Step 260: Give a battery overdischarge warning according to the number of times of overdischarge damage of the battery.

Specifically, when the number of times of overdischarge damage of the battery is greater than or equal to a preset value, the battery or the moving platform gives a battery overdischarge warning, and the moving platform and/or the user can perform a corresponding response and operation according to the warning to ensure the safety of the moving platform during operation. In specific implementations, the overdischarge warning may include a first-level warning prompt, a second-level warning prompt, and a third-level warning prompt. A larger number of times of overdischarge damage indicates a higher level of the warning prompt, and indicates a larger probability that the battery has a potential safety hazard.

In this embodiment, by storing the number of times of overdischarge damage of the battery, acquiring the number of times of overdischarge damage of the battery after receiving a battery power-on signal, and giving a battery overdischarge warning according to the number of times of overdischarge damage of the battery, a warning can be given according to the degree and number of occurrences of overdischarge of the battery, so that the moving platform and/or the user can perform a corresponding response and operation according to the warning to ensure the safety of the moving platform during operation.

Embodiment 3

Figure 7:
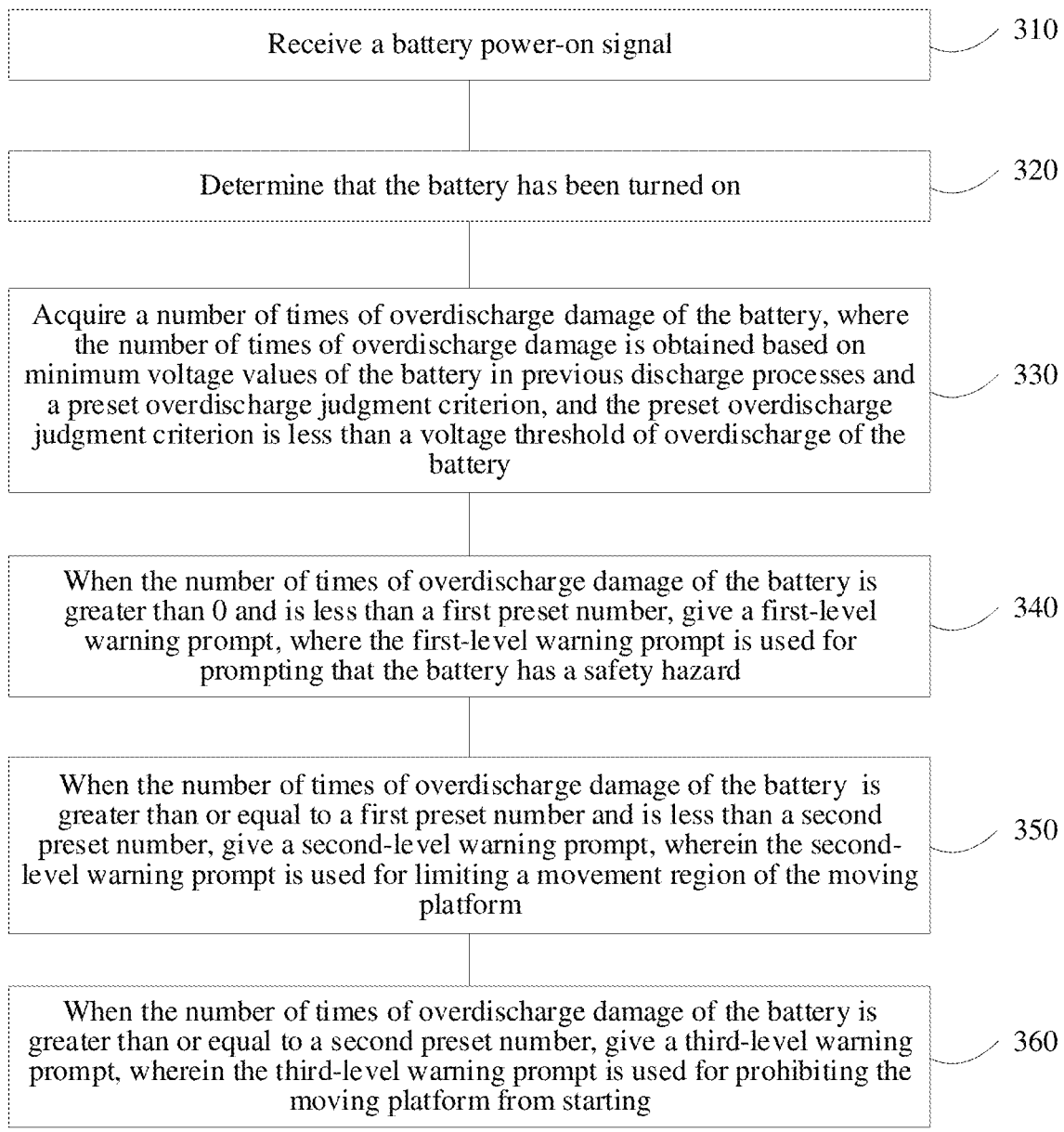
FIG. 7 is a schematic diagram of a method for warning overdischarge of a battery according to a third embodiment of the present invention.

Referring to FIG. 7, FIG. 7 is a schematic diagram of still another method for warning overdischarge of a battery according to an embodiment of the present invention. The battery is configured to supply power to a moving platform. The method is applied to the battery or the moving platform. The method includes:

Step 310: Receive a battery power-on signal.

Step 320: Determine that the battery has been turned on.

In this embodiment, turning on the battery includes: establishing an electrical connection between the battery and the moving platform.

Step 330: Acquire a number of times of overdischarge damage of the battery, where the number of times of overdischarge damage is obtained based on minimum voltage values of the battery in previous discharge processes and a preset overdischarge judgment criterion, and the preset overdischarge judgment criterion is less than a voltage threshold of overdischarge of the battery.

The voltage threshold of overdischarge of the battery may be a discharge cut-off voltage of the cell, or slightly greater than the discharge cut-off voltage of the cell. The discharge cut-off voltage refers to the lowest working voltage that the voltage can drop to during the discharge process and at which the discharge should be stopped. The preset overdischarge judgment criterion is defined as such a threshold that when the voltage value of the battery is lower than this threshold, the battery will be irreversibly damaged.

The voltage threshold of overdischarge of the battery and the preset overdischarge judgment criterion may be configured in advance, or may be set as required.

It should be noted that a battery generally includes at least one cell, and the minimum voltage value described in this embodiment is the minimum voltage value of a single cell. For how to obtain the minimum voltage value of the battery in the battery discharge process and how to obtain the number of times of overdischarge damage of the battery based on the minimum voltage values of the battery in the previous discharge processes and the preset overdischarge judgment criterion, reference can be made to Embodiment 1 and Embodiment 2 for details, which are readily understood by those skilled in the art and therefore will not be repeated herein.

Step 340: When the number of times of overdischarge damage of the battery is greater than 0 and is less than a first preset number, give a first-level warning prompt, where the first-level warning prompt is used for prompting that the battery has a safety hazard.

When the number of times of overdischarge damage of the battery is greater than 0 and is less than a first preset number, the battery or the moving platform gives a first-level warning prompt. Taking the battery as an example, in an embodiment, a display device (such as an LED light) is provided on the battery, and an observation window corresponding to the LED light is provided on a battery compartment of the moving platform. When the number of times of overdischarge damage of the battery is greater than 0 and less than the first preset number, the control chip of the battery controls the LED light to display a color corresponding to the first-level warning prompt. In another embodiment, the control chip of the battery sends the first-level warning prompt to the moving platform, so that the moving platform controls a prompting device thereof to give a prompt.

Step 350: When the number of times of overdischarge damage of the battery is greater than or equal to a first preset number and is less than a second preset number, give a second-level warning prompt, where the second-level warning prompt is used for limiting a movement region of the moving platform.

The moving platform includes a positioning device and a power device. A current location of the moving platform can be obtained by the positioning device, and the movement of the moving platform can be controlled by the power device. When the number of times of overdischarge damage of the battery is greater than or equal to the first preset number and less than the second preset number, the movement region of the moving platform needs to be limited so that the loss can be stopped in time when an unexpected situation occurs on the moving platform.

Exemplarily, when the moving platform is an aerial vehicle, the second-level warning prompt is used for limiting a flight altitude and/or flying distance of the aerial vehicle.

Step 360: When the number of times of overdischarge damage of the battery is greater than or equal to a second preset number, give a third-level warning prompt, where the third-level warning prompt is used for prohibiting the moving platform from starting.

When the number of times of overdischarge damage of the battery is greater than or equal to the second preset number, it indicates that a high degree and a large number of times of overdischarge of the battery, and there is a serious safety hazard. After receiving the third-level warning prompt, the moving platform prohibits itself from starting to avoid unsafe accidents.

In some embodiments, the battery further includes a display device, and the method further includes: displaying the overdischarge warning and/or the number of times of overdischarge damage on the display device of the battery. For example, the first preset number is 3, and the second preset number is 7. In this case, when the acquired number of times of overdischarge damage of the battery is 1, the first-level warning prompt and/or 1 is displayed on the display device of the battery; when the acquired number of times of overdischarge damage of the battery is 5, the second-level warning prompt and/or 5 is displayed on the display device of the battery; when the acquired number of times of overdischarge damage of the battery is 7, the third-level warning prompt and/or 7 is displayed on the display device of the battery.

In this embodiment, a first-level warning prompt, a second-level warning prompt, or a third-level warning prompt is given according to the number of times of overdischarge damage of the battery, where the first-level warning prompt is used for prompting that the battery has a safety hazard, the second-level warning prompt is used for limiting a movement region of the moving platform, and the third-level warning prompt is used for prohibiting the moving platform from starting. In this way, a warning can be given according to the degree and number of occurrences of overdischarge of the battery, so that the moving platform and/or the user can perform a corresponding response and operation according to the warning to ensure the safety of the moving platform during operation and avoid unsafe accidents.

Embodiment 4

Figure 8:
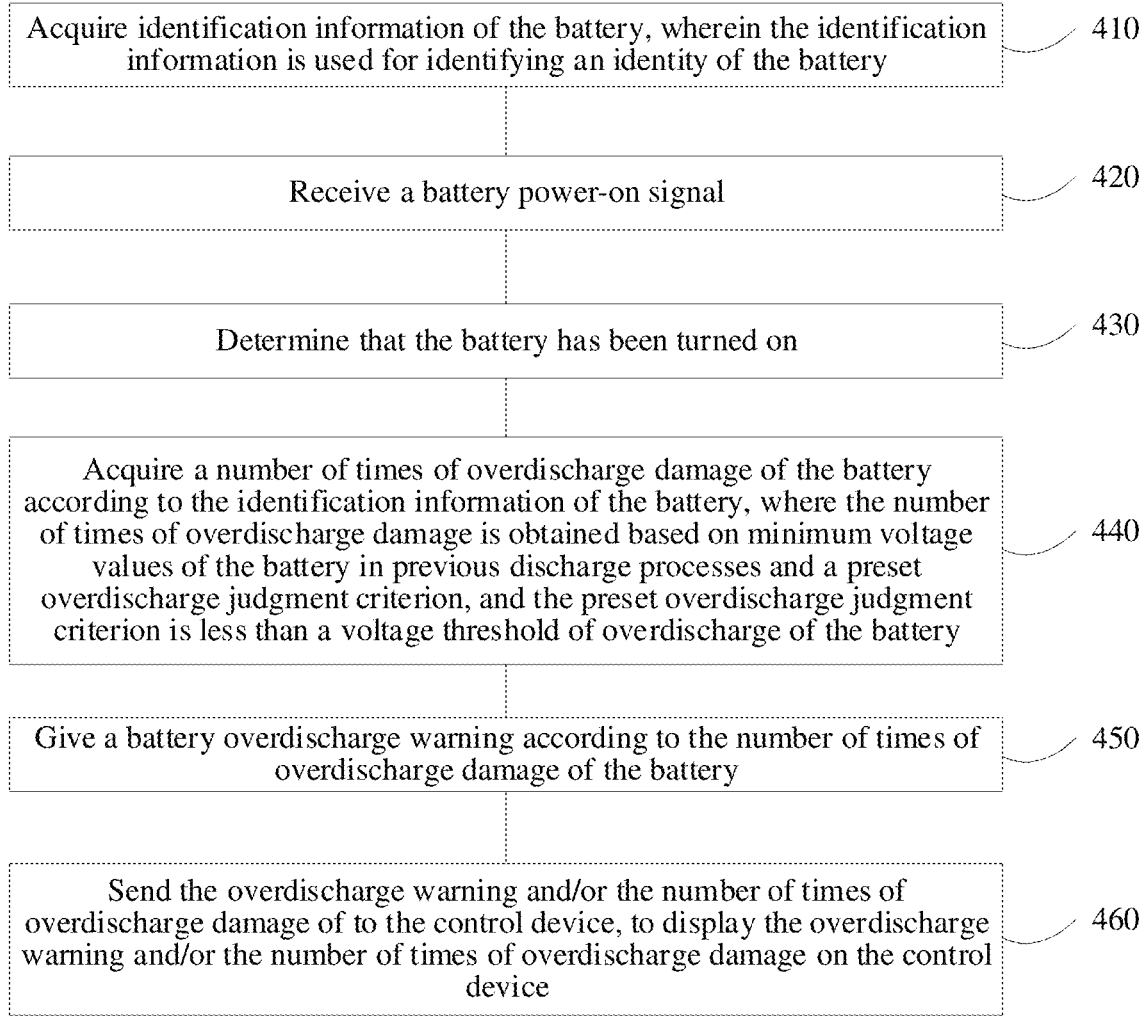
FIG. 8 is a schematic diagram of a method for warning overdischarge of a battery according to a fourth embodiment of the present invention.

Referring to FIG. 8, FIG. 8 is a schematic diagram of a method for warning overdischarge of a battery according to an embodiment of the present invention. The battery is configured to supply power to a moving platform. The moving platform is communicably connected to the control device. The control device is configured to control the moving platform. The method is applied to the moving platform. The method includes:

Step 410: Acquire identification information of the battery, where the identification information is used for identifying an identity of the battery.

In actual applications, the moving platform may include a plurality of spare batteries. In order to evaluate the safety performance of the batteries, data information of each battery is stored in the moving platform, that is, data information stored in the moving platform includes a mapping relationship between identification information and data information of the battery. The identification information is used for identifying an identity of the battery, and may be an ID number or serial number of the battery.

There are many ways to acquire the identification information of the battery. In an embodiment, a tag (such as an RFID tag) is disposed on the battery, and a reader is correspondingly disposed in the battery compartment. When a battery is installed in the battery compartment, identification information of the battery can be obtained according to data information read by the reader. In another embodiment, different contact terminals may be disposed on the batteries, and identification information of a battery can be acquired based on a change in level of a certain port among connection ports between the moving platform and the batteries.

Step 420: Receive a battery power-on signal.

Step 430: Determine that the battery has been turned on.

Step 440: Acquire a number of times of overdischarge damage of the battery according to the identification information of the battery, where the number of times of overdischarge damage is obtained based on minimum voltage values of the battery in previous discharge processes and a preset overdischarge judgment criterion, and the preset overdischarge judgment criterion is less than a voltage threshold of overdischarge of the battery.

Step 450: Give a battery overdischarge warning according to the number of times of overdischarge damage of the battery.

For step 430 to step 450, reference can be made to Embodiment 1 to Embodiment 3 for details, which are readily understood by those skilled in the art and therefore will not be repeated herein.

Optionally, this embodiment may further include Step 460: Send the overdischarge warning and/or the number of times of overdischarge damage of to the control device, to display the overdischarge warning and/or the number of times of overdischarge damage on the control device.

The control device may include a remote control, a smart phone, a tablet computer, and the like. In this embodiment, by sending the overdischarge warning and/or the number of times of overdischarge damage to the control device, the user can be intuitively alerted.

For example, when the overdischarge warning is a first-level warning prompt, the first-level warning prompt is displayed on an interface of a remote control or an APP interface of a smart phone, to prompt that the battery has a safety hazard; when the overdischarge warning is a second-level warning prompt, the second-level warning prompt is displayed on an interface of a remote control or an APP interface of a smart phone, and an allowed movement region for the moving platform is prompted; when the overdischarge warning is a third-level warning prompt, the third-level warning prompt is displayed on an interface of a remote control or an APP interface of a smart phone, and a prompt indicating that the moving platform has failed to start is given, to instruct the user to replace the battery.

Embodiment 5

Figure 9:
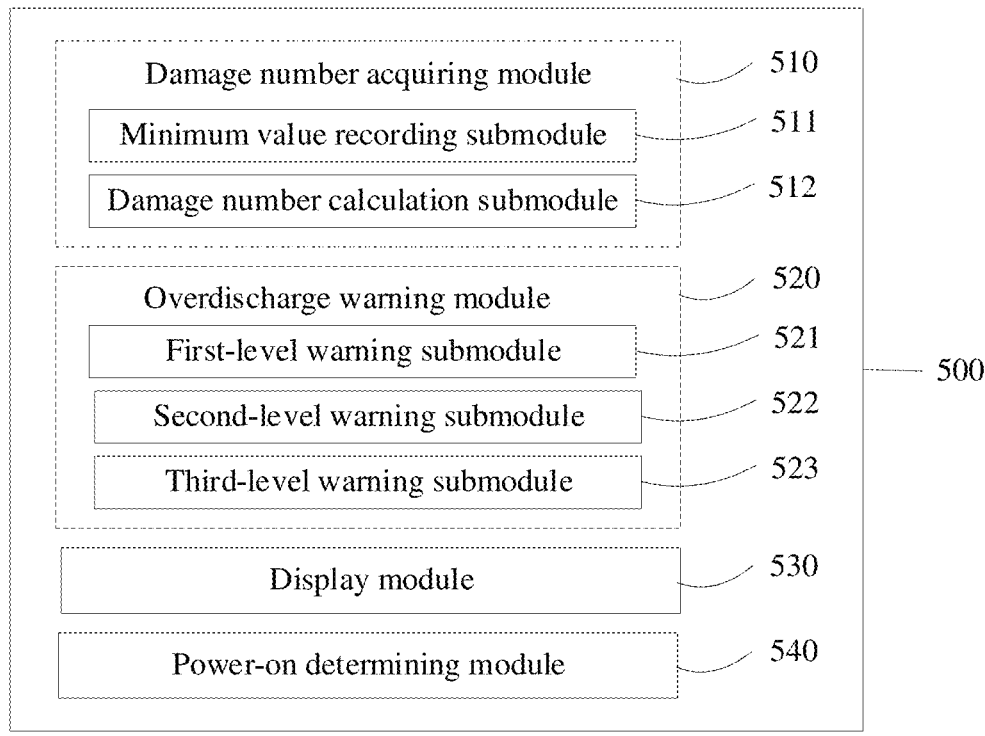
FIG. 9 is a schematic diagram of a device for warning overdischarge of a battery according to a fifth embodiment of the present invention.

Referring to FIG. 9, FIG. 9 is a schematic diagram of a device for warning overdischarge of a battery according to an embodiment of the present invention. The device 500 for warning overdischarge of a battery is configured to give an overdischarge warning according to the degree and number of times of battery overdischarge. The battery may be a lithium battery, nickel-cadmium battery or other storage batteries.

The device 500 for warning overdischarge of a battery may be configured in any suitable type of chip with a certain logic computing capability, such as a control chip of a battery or a main control chip of a moving platform.

As shown in FIG. 9, the device 500 includes:

a damage number acquiring module 510, configured to acquire a number of times of overdischarge damage of the battery, where the number of times of overdischarge damage is obtained based on minimum voltage values of the battery in previous discharge processes and a preset overdischarge judgment criterion, and the preset overdischarge judgment criterion is less than a voltage threshold of overdischarge of the battery; and an overdischarge warning module 520, configured to give a battery overdischarge warning according to the number of times of overdischarge damage of the battery.

In this embodiment, the damage number acquiring module 510 acquires a number of times of overdischarge damage of the battery, and the overdischarge warning module 520 gives a battery overdischarge warning according to the number of times of overdischarge damage of the battery. In this way, a warning can be given according to the degree and number of occurrences of overdischarge of the battery, so that a moving platform and/or a user can perform a corresponding response and operation according to the warning to ensure the safety of the moving platform during operation.

In this embodiment, the damage number acquiring module 510 includes:

a minimum value recording submodule 511, configured to acquire a minimum voltage value record of the battery, where the minimum voltage value record is a set of minimum voltage values of the battery in the previous discharge processes; and a damage number calculation submodule 512, configured to acquire the number of times of overdischarge damage of the battery according to the minimum voltage value record.

The acquiring a minimum voltage value record of the battery includes:

recording minimum voltage values of the battery in the previous discharge processes; and storing the minimum voltage values of the battery in the previous discharge processes to form the minimum voltage value record.

Optionally, the acquiring a minimum voltage value record of the battery further includes:

determining, in each discharge process of the battery, whether a voltage of the battery is lower than the voltage threshold of overdischarge of the battery; and if yes, recording a minimum voltage value of the battery in each discharge process, where the minimum voltage value is used for forming the minimum voltage value record.

The damage number calculation submodule 512 is further configured to:
  compare each minimum voltage value in the minimum voltage value record with the preset overdischarge judgment criterion; and
  calculate a number of times the minimum voltage values in the minimum voltage value record are less than the preset overdischarge judgment criterion, to obtain the number of times of overdischarge damage of the battery.

Figure 10:
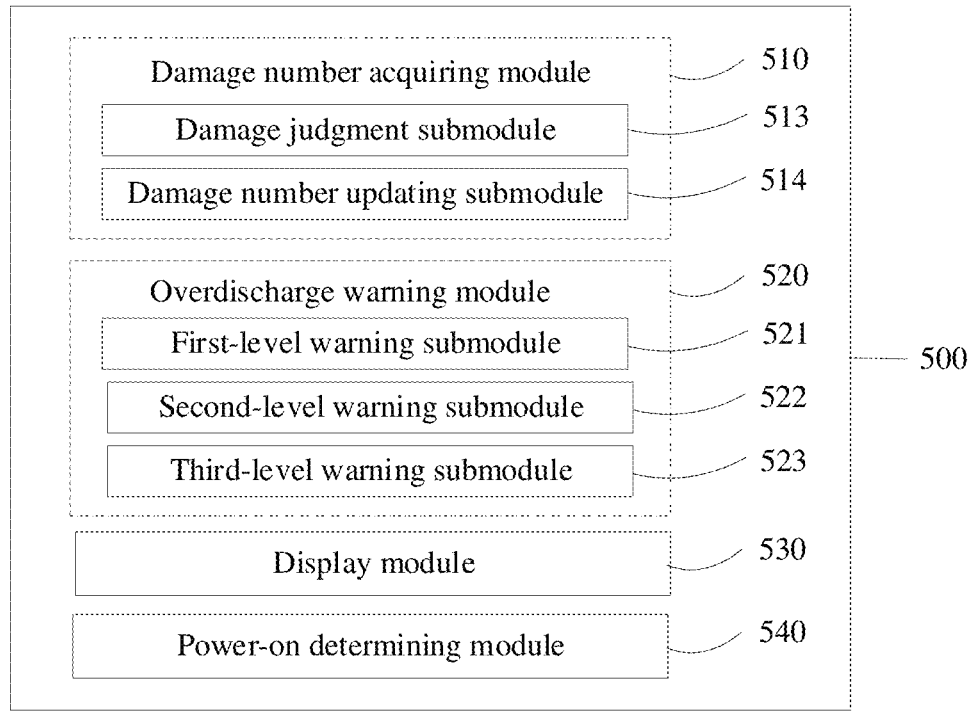
FIG. 10 is a schematic diagram of another device for warning overdischarge of a battery according to the fifth embodiment of the present invention.

In another embodiment, as shown in FIG. 10, the damage number acquiring module 510 includes:
  a damage judgment submodule 513, configured to acquire a minimum voltage value of the battery in each discharge process, and determine whether the minimum voltage value is lower than the preset overdischarge judgment criterion; and
  a damage number updating submodule 514, configured to: increase the number of times of overdischarge damage of the battery by 1, and record the updated number of times of overdischarge damage; and
  the damage number acquiring module 510 is further configured to:
  acquire a latest number of times of overdischarge damage of the battery.

Optionally, the acquiring a minimum voltage value of the battery in each discharge process includes:
  determining, in each discharge process of the battery, whether a voltage of the battery is lower than the voltage threshold of overdischarge of the battery; and
  if yes, acquiring the minimum voltage value of the battery in each discharge processes.

In the above embodiment, the voltage threshold of overdischarge of the battery is 3 V, and the preset overdischarge judgment criterion is 1.5 V.

The overdischarge warning module 520 may include:
  a first-level warning submodule 521, configured to: when the number of times of overdischarge damage of the battery is greater than 0 and is less than a first preset number, give a first-level warning prompt, where the first-level warning prompt is used for prompting that the battery has a safety hazard;
  a first-level warning submodule 522, configured to: when the number of times of overdischarge damage of the battery is greater than or equal to a first preset number and is less than a second preset number, give a second-level warning prompt, where the second-level warning prompt is used for limiting a movement region of the moving platform; and
  a third-level warning submodule 523, configured to: when the number of times of overdischarge damage of the battery is greater than or equal to a second preset number, give a third-level warning prompt, where the third-level warning prompt is used for prohibiting the moving platform from starting.

Optionally, the battery further includes a display device, and the device 500 further includes:
  a display module 530, configured to display the overdischarge warning and/or the number of times of overdischarge damage on the display device of the battery.

Optionally, the device 500 further includes:
  a power-on determining module 540, configured to determine that the battery has been turned on.

When the device 500 is applied to a moving platform, the device 500 may further include:
  a sending module, configured to send the overdischarge warning and/or the number of times of overdischarge damage to a control device, to display the overdischarge warning and/or the number of times of overdischarge damage on the control device, where the control device is configured to control the moving platform and is communicably connected to the moving platform.

When the device 500 is applied to a moving platform, the device 500 may further include:
  an identification information acquiring module, configured to acquire identification information of the battery, where the identification information is used for identifying an identity of the battery; and
  the damage number acquiring module 510 is further configured to:
  acquire the number of times of overdischarge damage of the battery according to the identification information of the battery.

It should be noted that in the embodiments of the present invention, the device 500 for warning overdischarge of a battery can execute the method for warning overdischarge of a battery provided in the embodiments of the present invention, and has functional modules and beneficial effects corresponding to the method executed. For technical details that are not described in detail in the embodiments of the device, reference can be made to the method for warning overdischarge of a battery provided in the embodiments of the present invention.

Embodiment 6

The embodiments of the present invention provide a computer program product, including a computer program stored in a non-volatile computer-readable storage medium, the computer program including program instructions, the program instructions, when executed by a computer, causing the computer to perform the method for warning overdischarge of a battery described above. For example, the methods shown in FIG. 5 to FIG. 8 described above are executed to realize the functions of the modules in FIG. 9 and FIG. 10.

The embodiments of the present invention further provide a non-volatile computer-readable storage medium, the computer-readable storage medium storing computer executable instructions, the computer executable instructions being configured to cause a computer to perform the method for warning overdischarge of a battery described above. For example, the methods shown in FIG. 5 to FIG. 8 described above are executed to realize the functions of the modules in FIG. 9 and FIG. 10.

It should be noted that, the described apparatus embodiment is merely an example. The modules described as separate parts may or may not be physically separate, and parts displayed as modules may or may not be physical modules, may be located in one position, or may be distributed on a plurality of network modules. Some or all of the modules may be selected according to actual needs to implement the objectives of the solutions of the embodiments.

Through the description of the foregoing embodiments, a person skilled in the art may clearly understand that the embodiments may be implemented by software in combination with a universal hardware platform, and may certainly be implemented by hardware. A person of ordinary skill in the art may understand that all or some of the processes of the methods in the embodiments may be implemented by a computer program instructing relevant hardware. The program may be stored in a computer-readable storage medium. During execution of the program, the processes of the method embodiments may be performed. The foregoing storage medium may be a read-only memory (ROM), a random access memory (RAM) or the like.

Finally, it should be noted that the foregoing embodiments are merely used for describing the technical solutions of the present invention, but are not intended to limit the present invention. Under the concept of the present invention, the technical features in the foregoing embodiments or different embodiments may be combined, the steps may be implemented in any sequence, and there may be many other changes in different aspects of the present invention as described above. For brevity, those are not provided in detail. Although the present invention is described in detail with reference to the foregoing embodiments, a person of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. A method for warning overdischarge of a battery, wherein the battery is configured to supply power to a moving platform, the method comprising:
    acquiring a number of times of overdischarge damage of the battery, wherein the number of times of overdischarge damage is obtained based on minimum voltage values of the battery in previous discharge processes and a preset overdischarge judgment criterion, and the preset overdischarge judgment criterion is less than a voltage threshold of overdischarge of the battery; and
    giving a battery overdischarge warning according to the number of times of overdischarge damage of the battery;
    the giving a battery overdischarge warning according to the number of times of overdischarge damage of the battery comprises:
    when the number of times of overdischarge damage of the battery is greater than 0 and is less than a first preset number, giving a first-level warning prompt, wherein the first-level warning prompt is configured to prompt that the battery has a safety hazard;
    when the number of times of overdischarge damage of the battery is greater than or equal to a first preset number and is less than a second preset number, giving a second-level warning prompt, wherein the second-level warning prompt is configured to limit a movement region of the moving platform.

2. The method according to claim 1, wherein the acquiring a number of times of overdischarge damage of the battery comprises:
    acquiring a minimum voltage value record of the battery, wherein the minimum voltage value record is a set of minimum voltage values of the battery in the previous discharge processes; and
    acquiring the number of times of overdischarge damage of the battery according to the minimum voltage value record.

3. The method according to claim 2, wherein the acquiring a minimum voltage value record of the battery comprises:
    recording minimum voltage values of the battery in the previous discharge processes; and
    storing the minimum voltage values of the battery in the previous discharge processes to form the minimum voltage value record.

4. The method according to claim 2, wherein the acquiring a minimum voltage value record of the battery comprises:
    determining, in each discharge process of the battery, whether a voltage of the battery is lower than the voltage threshold of overdischarge of the battery; and
    when the voltage of the battery is lower than the voltage threshold of overdischarge of the battery recording a minimum voltage value of the battery in each discharge process, wherein the minimum voltage value is used for forming the minimum voltage value record.

5. The method according to claim 2, wherein the acquiring the number of times of overdischarge damage of the battery according to the minimum voltage value record comprises:
    comparing each minimum voltage value in the minimum voltage value record with the preset overdischarge judgment criterion; and
    calculating a number of times the minimum voltage values in the minimum voltage value record are less than the preset overdischarge judgment criterion, to obtain the number of times of overdischarge damage of the battery.

6. The method according to claim 1, wherein the acquiring a number of times of overdischarge damage of the battery comprises:
    acquiring a minimum voltage value of the battery in each discharge process, and determining whether the minimum voltage value is lower than the preset overdischarge judgment criterion;
    when the minimum voltage value is lower than the preset overdischarge judgement criterion, increasing the number of times of overdischarge damage of the battery by 1, and recording the updated number of times of overdischarge damage; and
    acquiring a latest number of times of overdischarge damage of the battery.

7. The method according to claim 6, wherein the acquiring a minimum voltage value of the battery in each discharge process comprises:
    determining, in each discharge process of the battery, whether a voltage of the battery is lower than the voltage threshold of overdischarge of the battery; and
    when the voltage of the battery is lower than the voltage threshold of overdischarge of the battery, acquiring the minimum voltage value of the battery in each discharge processes.

8. The method according to claim 1, wherein
    the voltage threshold of overdischarge of the battery is 3 V, and the preset overdischarge judgment criterion is 1.5 V.

9. The method according to claim 1, wherein
    the giving a battery overdischarge warning according to the number of times of overdischarge damage of the battery comprises:
    when the number of times of overdischarge damage of the battery is greater than or equal to a second preset number, giving a third-level warning prompt, wherein the third-level warning prompt is configured to prohibit the moving platform from starting.

10. The method according to claim 1, wherein the battery further comprises a display device, and the method further comprises:
    displaying the overdischarge warning and/or the number of times of overdischarge damage on the display device of the battery.

11. The method according to claim 1, wherein before the acquiring a number of times of overdischarge damage of the battery, the method further comprises:
determining that the battery has been turned on.

12. The method according to claim 1, further comprising:
sending the overdischarge warning and/or the number of times of overdischarge damage to a control device, to display the overdischarge warning and/or the number of times of overdischarge damage on the control device, wherein the control device is configured to control the moving platform and is communicably connected to the moving platform.

13. The method according to claim 1, wherein before the acquiring a number of times of overdischarge damage of the battery, the method further comprises:
acquiring identification information of the battery, wherein the identification information is used for identifying an identity of the battery; and
the acquiring a number of times of overdischarge damage of the battery comprises:
acquiring the number of times of overdischarge damage of the battery according to the identification information of the battery.

14. The method according to claim 1, wherein the moving platform is an aerial vehicle.

15. A device for warning overdischarge of a battery, wherein the battery is configured to supply power to a moving platform, the device comprising:
a processor, configured to acquire a number of times of overdischarge damage of the battery, wherein the number of times of overdischarge damage is obtained based on minimum voltage values of the battery in previous discharge processes and a preset overdischarge judgment criterion, and the preset overdischarge judgment criterion is less than a voltage threshold of overdischarge of the battery; and
give a battery overdischarge warning according to the number of times of overdischarge damage of the battery;
the processor is further configured to:
when the number of times of overdischarge damage of the battery is greater than 0 and is less than a first preset number, give a first-level warning prompt, wherein the first-level warning prompt is configured to prompt that the battery has a safety hazard;
when the number of times of overdischarge damage of the battery is greater than or equal to a first preset number and is less than a second preset number, give a second-level warning prompt, wherein the second-level warning prompt is configured to limit a movement region of the moving platform.

16. The device according to claim 15, wherein the processor is further configured to:
acquire a minimum voltage value record of the battery, wherein the minimum voltage value record is a set of minimum voltage values of the battery in the previous discharge processes; and
acquire the number of times of overdischarge damage of the battery according to the minimum voltage value record.

17. The device according to claim 16, wherein the processor is further configured to:
record minimum voltage values of the battery in the previous discharge processes; and
store the minimum voltage values of the battery in the previous discharge processes to form the minimum voltage value record.

18. The device according to claim 16, wherein the processor is further configured to:
determine, in each discharge process of the battery, whether a voltage of the battery is lower than the voltage threshold of overdischarge of the battery; and
when the voltage of the battery is lower than the voltage threshold of overdischarge of the battery, record a minimum voltage value of the battery in each discharge process, wherein the minimum voltage value is used for forming the minimum voltage value record.

19. The device according to claim 16, wherein the processor is further configured to:
compare each minimum voltage value in the minimum voltage value record with the preset overdischarge judgment criterion; and
calculate a number of times the minimum voltage values in the minimum voltage value record are less than the preset overdischarge judgment criterion, to obtain the number of times of overdischarge damage of the battery.

20. The device according to claim 15, wherein the processor is further configured to:
acquire a minimum voltage value of the battery in each discharge process, and determining whether the minimum voltage value is lower than the preset overdischarge judgment criterion;
when the minimum voltage value is lower than the preset overdischarge judgment criterion, increase the number of times of overdischarge damage of the battery by 1, and record the updated number of times of overdischarge damage; and
acquire a latest number of times of overdischarge damage of the battery.

21. The device according to claim 20, wherein the processor is further configured to:
determine, in each discharge process of the battery, whether a voltage of the battery is lower than the voltage threshold of overdischarge of the battery; and
when a voltage of the battery is lower than the voltage threshold of overdischarge of the battery, acquire the minimum voltage value of the battery in each discharge processes.

22. The device according to claim 15, wherein
the voltage threshold of overdischarge of the battery is 3 V, and the preset overdischarge judgment criterion is 1.5 V.

23. The device according to claim 15, wherein the processor is further configured to:
when the number of times of overdischarge damage of the battery is greater than or equal to a second preset number, give a third-level warning prompt, wherein the third-level warning prompt is configured to prohibit the moving platform from starting.

24. The device according to claim 15, wherein the battery further comprises a display device, and
the processor is further configured to display the overdischarge warning and/or the number of times of overdischarge damage on the display device of the battery.

25. The device according to claim 15, wherein
the processor is further configured to determine that the battery has been turned on.

26. The device according to claim 15, wherein
the processor is further configured to send the overdischarge warning and/or the number of times of overdischarge damage to a control device, to display the overdischarge warning and/or the number of times of overdischarge damage on the control device, wherein the control device is configured to control the moving platform and is communicably connected to the moving platform.

27. The device according to claim 15, wherein
the processor is further configured to acquire identification information of the battery, wherein the identification information is used for identifying an identity of the battery; and
acquire the number of times of overdischarge damage of the battery according to the identification information of the battery.

28. The device according to claim 15, wherein the moving platform is an aerial vehicle.

29. A battery, comprising a housing and a cell disposed inside the housing, the battery further comprising a control chip, wherein the control chip is electrically connected to the cell, and the control chip comprises:
   at least one processor; and
   a memory communicably connected to the at least one processor, wherein
   the memory stores instructions executable by the at least one processor, wherein the instructions are executed by the at least one processor to cause the at least one processor to execute:
   acquiring a number of times of overdischarge damage of the battery, wherein the number of times of overdischarge damage is obtained based on minimum voltage values of the battery in previous discharge processes and a preset overdischarge judgment criterion, and the preset overdischarge judgment criterion is less than a voltage threshold of overdischarge of the battery; and
   giving a battery overdischarge warning according to the number of times of overdischarge damage of the battery;
   when the number of times of overdischarge damage of the battery is greater than 0 and is less than a first preset number, giving a first-level warning prompt, wherein the first-level warning prompt is configured to prompt that the battery has a safety hazard;
   when the number of times of overdischarge damage of the battery is greater than or equal to a first preset number and is less than a second preset number, giving a second-level warning prompt, wherein the second-level warning prompt is configured to limit a movement region of the moving platform.

30. An aerial vehicle, comprising a vehicle body, an arm connected to the vehicle body, a power device disposed on the arm, and a battery disposed on the vehicle body, wherein the battery is configured to supply power to the aerial vehicle, the battery comprises a housing and a cell disposed inside the housing, the battery further comprises a control chip, the control chip is electrically connected to the cell, and the control chip comprises:
   at least one processor; and
   a memory communicably connected to the at least one processor, wherein
   the memory stores instructions executable by the at least one processor, wherein the instructions are executed by the at least one processor to cause the at least one processor to execute:
   acquiring a number of times of overdischarge damage of the battery, wherein the number of times of overdischarge damage is obtained based on minimum voltage values of the battery in previous discharge processes and a preset overdischarge judgment criterion, and the preset overdischarge judgment criterion is less than a voltage threshold of overdischarge of the battery; and
   giving a battery overdischarge warning according to the number of times of overdischarge damage of the battery;
   when the number of times of overdischarge damage of the battery is great than 0 and is less than a first preset number, giving a first-level warning prompt, wherein the first-level warning prompt is configured to prompt that the battery has a safety hazard;
   when the number of times of overdischarge damage of the battery is greater than or equal to a first preset number and is less than a second preset number, giving a second-level warning prompt, wherein the second-level warning prompt is configured to limit a movement region of the moving platform.

* * * * *